United States Patent
Chatrenet et al.

(10) Patent No.: US 8,521,365 B2
(45) Date of Patent: Aug. 27, 2013

(54) METHOD AND DEVICE FOR THE LATERAL CONTROL OF A TAXIING AIRCRAFT

(75) Inventors: Dominique Chatrenet, Cornebarrieu (FR); Fabrice Villaumé, Seysses (FR); Céline Bourissou, Plaisance du Touch (FR); Pierre Scacchi, Toulouse (FR); Louis-Emmanuel Romana, Bristol (GB)

(73) Assignee: Airbus Operations (SAS), Toulouse Cedex (FR)

( * ) Notice: Subject to any disclaimer, the term of this patent is extended or adjusted under 35 U.S.C. 154(b) by 479 days.

(21) Appl. No.: 12/922,354

(22) PCT Filed: Mar. 6, 2009

(86) PCT No.: PCT/EP2009/001762
§ 371 (c)(1),
(2), (4) Date: Sep. 13, 2010

(87) PCT Pub. No.: WO2009/115224
PCT Pub. Date: Sep. 24, 2009

(65) Prior Publication Data
US 2011/0004376 A1   Jan. 6, 2011

(30) Foreign Application Priority Data
Mar. 18, 2008   (FR) ...................................... 08 01472

(51) Int. Cl.
*G05D 1/00* (2006.01)
*G06F 7/00* (2006.01)

(52) U.S. Cl.
USPC ................. 701/41; 701/10; 701/11; 701/120; 701/14; 701/15

(58) Field of Classification Search
None
See application file for complete search history.

(56) References Cited

U.S. PATENT DOCUMENTS

| | | |
|---|---|---|
| 4,221,350 A | 9/1980 | Moser et al. |
| 4,482,961 A | 11/1984 | Kilner et al. |
| 7,059,562 B2 * | 6/2006 | Baldwin ...................... 244/12.4 |
| 2002/0100834 A1 * | 8/2002 | Baldwin ...................... 244/12.4 |
| 2004/0230353 A1 | 11/2004 | Villaume et al. |
| 2005/0109874 A1 * | 5/2005 | Baldwin ...................... 244/12.4 |
| 2006/0186267 A1 | 8/2006 | Steiner et al. |
| 2008/0197239 A1 | 8/2008 | Bellouard et al. |
| 2009/0150068 A1 * | 6/2009 | Villaume et al. .............. 701/206 |
| 2009/0210126 A1 | 8/2009 | Dellac et al. |

* cited by examiner

*Primary Examiner* — Ian Jen
(74) *Attorney, Agent, or Firm* — Novak Druce Connolly Bove + Quigg LLP

(57) ABSTRACT

The invention relates to a device including elements for automatically controlling an aircraft on the ground along the lateral axis, by a dissymmetrical use of the engines and/or brakes of the aircraft.

10 Claims, 5 Drawing Sheets

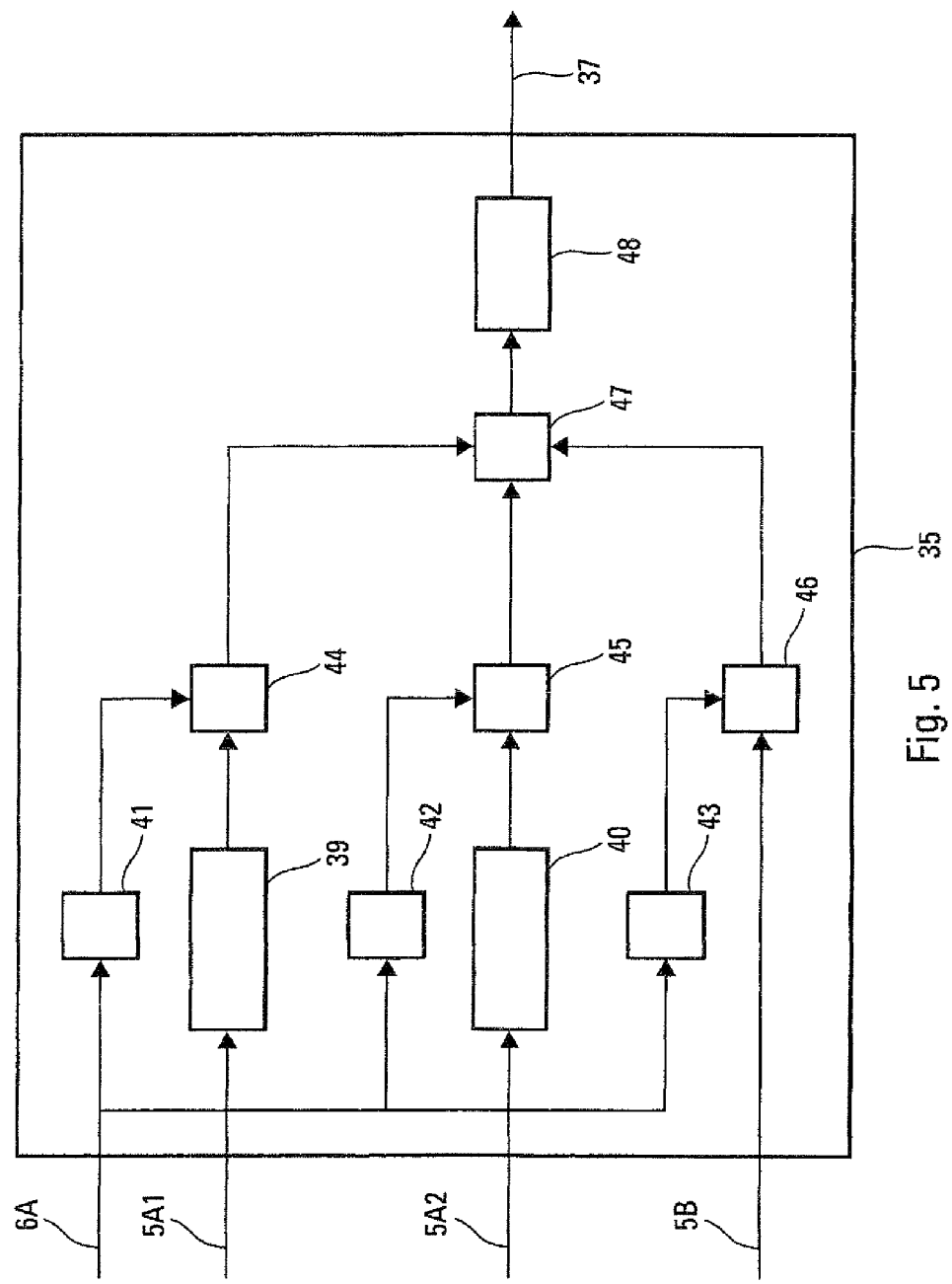

METHOD AND DEVICE FOR THE LATERAL CONTROL OF A TAXIING AIRCRAFT

CROSS-REFERENCE TO RELATED APPLICATIONS

This application is a §371 national stage entry of International Application No. PCT/EP2009/001762, filed Mar. 6, 2009, which claims priority to French Patent Application 0801472, filed Mar. 18, 2008, the entire contents of which are incorporated herein by reference.

FIELD OF THE INVENTION

The present invention relates to a process and a device for the lateral control of a taxiing aircraft, in particular in an airport.

BACKGROUND OF THE INVENTION

The present invention relates to an aircraft taxiing, in particular a civil or military, passenger or freight transport airplane or even a drone. It more particularly relates to generating a yaw moment (according to the vertical axis of the aircraft) allowing to laterally control the taxiing aircraft.

Within the framework of the present invention, taxiing means any possible type of running for an aircraft, such as either running on a landing runway during landing and take off phases, or running on traffic lanes or on maneuvering areas, in particular.

Today, the pilot controls the lateral movements of the aircraft on the ground using manual command units (for example, a hand wheel allowing to orient the wheel of the front landing gear, a joystick for controlling the engine thrust, brake pedals, a directional crossbar), along a trajectory on the ground. Such command units allow to control actuators of the aircraft being able to influence the lateral movements of the aircraft, essentially through the orientation of the front wheel (and optionally the orientation of the rear gears) and the drift rudder, and more rarely, via an asymmetrical use of the engines and brakes.

Within the context of the present invention, a front wheel means a mechanical assembly being provided with at least one wheel, being located at the front of the aircraft, preferably being part of a front landing gear of the aircraft, and being orientable so as to be able to laterally shift the aircraft when the latter is taxiing.

Currently, in the event of a breakdown of the orientation system of the front wheel (for example, in the event of a loss from the hydraulic system supplying the actuator responsible for the orientation, in the event of a breakdown of the actuator itself, or even in the event of a loss of data transmission between the calculator controlling the actuator and the latter), the aircraft could no longer be laterally controlled through the usual command units (hand wheel, directional crossbar), and this, more especially, at a low speed, when the rudder has no significant effect any more on the yaw moment of the aircraft.

Sometimes, such types of breakdown occur in flight or after landing, which could make the landing phase risky. In the event of a loss of control of the front wheel, landing could no longer be performed by an automatic control system, and the pilot can only use the directional rudder, as well as, optionally, the brakes on an asymmetrical way thanks to the brake pedals, a maneuver the pilot is however not familiar with. Such a situation can be found to be difficult, or even dangerous, and lead to a runway excursion, at a more or less high speed if the pilot does not succeed to properly control the aircraft (for example because of a side wind, a breakdown of an engine, . . . ), which could lead to human and/or material losses or damage.

Once the aircraft stopped at the end of the runway, it is still possible to laterally control it, using the brakes and/or the engines on an asymmetrical way, and this, in order to quickly clear the runway and make it available for the aircrafts that are to land or to take off. However, the operational directive of airlines generally consists in compelling the pilot, taking in consideration the risky and potentially dangerous control resulting from the asymmetrical manual use of the brakes and/or the engines, to call on the ground traffic control so as to dispatch a towing tractor for towing the aircraft from the end of the runway to a cleared area of the airport (relation way, landing gate, . . . ). Indeed, the manual lateral control of an aircraft exclusively making use of the asymmetrical use of the brakes and engines could be found to be particularly difficult for a pilot not being familiar with such a maneuvering type, all the more as control could be found already difficult for large size aircrafts (for example of the AIRBUS A340-600 or A380 type) when the front wheel correctly operates (need to use an outside camera in sharp turns).

During the waiting time for the towing tractor and the towing time, the aircraft thus obstructs the runway and consequently disturbs the traffic on the ground (aircrafts to take off must wait, modification of the trajectory of the aircrafts on the ground if their progression is impacted by the aircraft being towed), as well as the air traffic (possible diversion to other airports for aircrafts that were in the approach phase, take-off delay for the aircrafts waiting for the runway to be released). Such a situation results in potentially significant delays, both for the broken down aircraft as well as for the aircrafts impacted by the air traffic and the traffic on the ground being disturbed. Such delays result in high costs for the airlines (in particular, financially and materially compensation for passengers, more specifically should the aircrafts be diverted).

Furthermore, the aircraft is grounded while the breakdown is being repaired. Such grounding time could be particularly long should spare parts not be available at the airport, or should repair not be made at the airport, in particular if the airport is isolated (or if it is located in a remote country). The grounding costs for an aircraft are thus particularly high, more specifically it the spare equipment is to be supplied from a remote location or if an additional aircraft is to be chartered for ensuring the air link and/or for repatriating the passengers.

SUMMARY OF THE INVENTION

The present invention relates to a method for a lateral control of an aircraft, in particular a civil or military transport airplane, running on the ground, said aircraft being provided with an orientable front wheel, said control method allowing for overcoming the above mentioned drawbacks.

To this end, according to the invention, said method is remarkable in that:

a) command orders are received relating to the orientation command of said front wheel;

b) a current ground speed of the aircraft is received; and c) from said command orders and said current ground speed, first orders are automatically determined for at least one of the following command assemblies of the aircraft: a set of brakes and a set of engines, each one of said command assemblies being able to generate a lateral movement of the aircraft around a vertical axis through an asymmetrical action, said first orders being determined so as to generate on the aircraft, when they are applied to a corresponding command assembly, a lateral movement being substantially identical to the lateral movement that the application of said command orders would generate to said front wheel.

Moreover, advantageously:
  said command orders are generated via means for generating preferably usual orders, for example usual control units or a usual automatic pilot system;
  said current ground speed of the aircraft is measured; and
  in a subsequent step d) said first orders are automatically applied to said command assembly(ies).

Thus, the inventive method allows the aircraft to be controlled on the ground according to the lateral axis, including in the event of a loss of control of the front wheel. In particular, said method is adapted to provide a minimum directional control allowing the pilot to be able, at least, to quickly clear the landing runway when the orientation system of the front wheel of the aircraft no longer works properly, and this by using the brakes and/or the engines on an asymmetrical way.

Furthermore, for generating said command orders, the same control units are used as in the nominal case (a case where the orientation system of the front wheel works properly), i.e. currently the hand wheels and rudder bars. Obviously, other control units, either existing or not, could be used for the manual control of such a function, for example units allowing for the lateral pilot with a view to the yaw speed. In all cases, the pilot does not make use of the brake pedals and/or the engine thrust joysticks for the lateral control of the aircraft according to the above mentioned basic embodiment of the method according to the invention.

Furthermore, using such a method, the behaviour of the aircraft (in terms of dynamics and viewing point feeling of the pilot) is very similar to that of the nominal case. As he also uses the same control units as the nominal case, using such a function is consequently nearly transparent for the pilot, who can then keep his manual control habits for ground maneuvers normally requiring the front wheel. As a result, implementing the present invention does not require any adaptation time from the pilot, and the latter will thus not be surprised by the behaviour of the function according to the invention that can automatically take over from the usual lateral control of the aircraft, in a particular embodiment to be further described hereinafter, in the event of a sudden breakdown of the orientation system of the front wheel. This makes the manual landing phase much more reliable, as the pilot can control the aircraft exactly as he would do in the nominal case, thus reducing his workload and his stress during a maneuver requiring a lot of attention.

Furthermore, implementing the process according to this invention could be controlled both manually by a human pilot (via the usual or future control units) as well as automatically by a usual automatic pilot system. Consequently, it is possible to keep the automatic pilot system for all the existing ground automatic functions (automatic or partially automatic landing) as well as future functions (automatic or partially automatic take off, automatic or partially automatic taxiing).

Furthermore, the aircraft is no longer dependent on an outside help (such as a towing tractor) for clearing the runway after landing. Consequently, the surrounding air traffic is not disturbed.

Similarly, the aircraft is no longer dependent on an outside help (towing tractor) for reaching the disembarkation gate. It could perform such a maneuver autonomously. Consequently, the traffic on the ground is not disturbed, and the aircraft is no longer responsible for delays usually generated by a breakdown of the orientation system of the front wheel, resulting in high costs for the airlines.

Thanks to the present invention, it could also be contemplated to restart the aircraft (with or without passengers and/or freight), even when a breakdown of the orientation system of the front wheel is still present. As a result, the aircraft is not longer grounded because of a repair period or spare parts or equipment having to be supplied. Consequently, repairing could occur in a much more flexible way, as the main space (the aircraft can head for another airport for being repaired therein) and time (the aircraft could be repaired later on) constraints disappear.

Advantageously, at step c):
  c1) an orientation angle of the front wheel is calculated, being representative of said command orders;
  c2) the current curve is calculated of a trajectory of the aircraft such as it would be if said front wheel was oriented according to said orientation angle; and
  c3) from at least said usual curve and said measured current ground speed, said first orders are calculated.

Moreover, in a particular embodiment, advantageously:
  said command orders are generated relating to the orientation control of said front wheel, said front wheel being able to be oriented by means of a usual orientation system;
  said orientation system is automatically monitored so as to be able to detect a breakdown of such an orientation system; and
  as long as a breakdown has not been detected, said command orders are automatically applied to said orientation system of the front wheel and said above mentioned steps a) to d) are not implemented; and
  as soon as a breakdown is detected, said steps a) to d) are implemented and said command orders are not applied to said orientation system of the front wheel.

Implementing such a particular embodiment does not require any adaptation time from the pilot. Thus, the pilot will not be surprised by the behaviour of the function, taking over from the lateral control of the aircraft, in the event of a sudden breakdown of the orientation system of the front wheel. This makes the manual landing phase much more reliable, as the pilot can control the aircraft exactly as he would do in the nominal case, thus reducing his workload and his stress during a maneuver requiring a lot of attention.

Moreover, in a particular embodiment:
  an overall command order is received of the yaw moment of the taxiing aircraft;
  such an overall order is automatically distributed:
    into command orders relating to the control of the orientation of the front wheel; and
    into auxiliary orders;
  for said command orders, said steps a) to d) are implemented; and
  said auxiliary orders are automatically applied to auxiliary means being able to act on the lateral movement of the aircraft.

In such a particular embodiment, implementing [steps a) to d)] of the method according to the present invention could be considered as an additional operating means allowing to laterally control the aircraft. Such a particular embodiment can be used for distributing the stresses needed for creating the yaw moment into different actuators, such as the orientation system of the front wheel, the directional rudder, the asymmetrical use of the brakes, and the asymmetrical use of the engines.

Thanks to this invention, braking and/or the asymmetrical thrust could be used to complement and/or replace the other actuators influencing the lateral movements of the aircraft, and this, even in the absence of a breakdown of one or more of such actuators.

Moreover, in a particular embodiment:
  in addition, second orders are received for controlling said command assembly, in particular, said set of brakes, said second orders being generated in a usual manner;
  from such second orders and said first orders, overall orders are determined; and
  at step d), said overall orders are applied to said command assembly as obtained from said first and second orders.

Thus, implementing the method according to this invention does not exclude any usual use of said set of engines and/or said set of brakes by the pilot, who can actuate such sets using his usual control units, in order to generate second orders being then taken into consideration as indicated in the previous embodiment. Consequently, thanks to such a particular embodiment, the pilot more specifically keeps the ability to brake through his brake pedals.

Moreover, advantageously, first orders are determined both comprising orders for said set of brakes and orders for said set of engines, and at step d), such orders are respectively applied to said set of brakes and to said set of engines.

Furthermore, advantageously, before applying said first orders to said command assembly, such first orders are limited to maximum values if they are higher than the latter.

The present invention also relates to a device for a lateral control of a taxiing aircraft, in particular a transport airplane, said aircraft being provided with an orientable front wheel.

According to this invention, said device is remarkable in that it comprises:
  means for receiving command orders relating to the control of the orientation of said front wheel;
  means for receiving a current ground speed of the aircraft; and
  means for automatically determining, from said command orders and said current ground speed, first orders for at least one of the following command assemblies of the aircraft: a set of brakes and a set of engines, each one of said command assemblies being able to generate a lateral movement of the aircraft around a vertical axis through an asymmetrical action, said first orders being determined so as to generate on the aircraft, when they are applied to a corresponding command assembly, a lateral movement being substantially identical to the lateral movement that the application of said command orders would generate to said front wheel.

In a preferred embodiment, said lateral control device further comprises:
  means for generating said command orders;
  means for measuring said current ground speed of the aircraft; and
  means for automatically applying said first orders to said command assembly(ies).

The present invention further relates to an aircraft being provided with a lateral control device as above-mentioned.

The figures of the appended drawing will better explain how this invention can be implemented. In these figures, like reference numerals relate to like components

BRIEF DESCRIPTION OF THE DRAWINGS

FIG. 5 is a block diagram of a preferred embodiment of calculation means of the calculation unit of FIG. 4.

DETAILED DESCRIPTION

Figure 1:
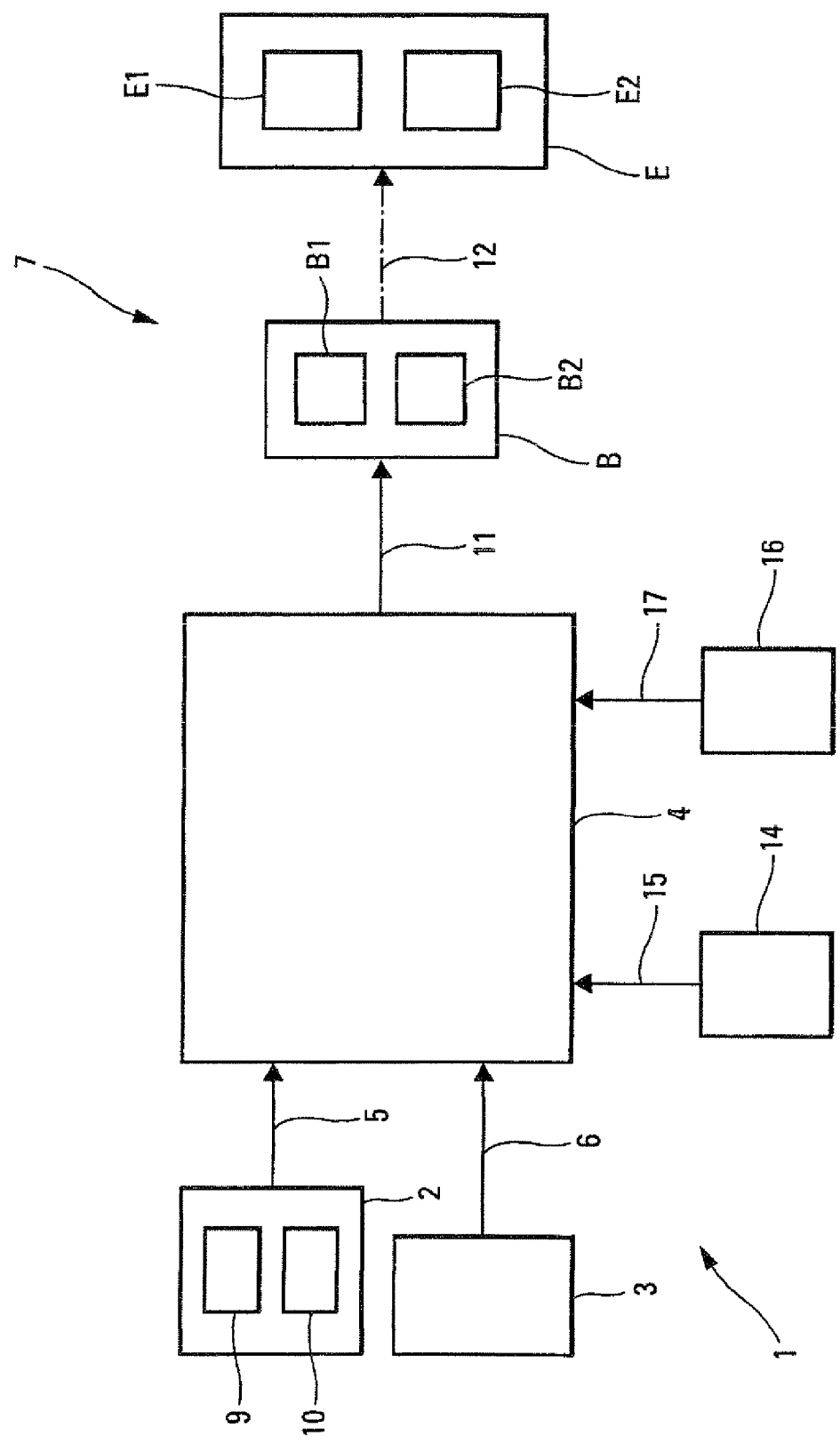
FIG. 1 is a block diagram of a device according to this invention in a basic embodiment.

The device 1 according to this invention and schematically shown on FIG. 1 is to be used for a lateral control of a taxiing aircraft, not shown, in particular, in an airport. Such an aircraft could be in particular a civil or military airplane, an airplane for transporting passengers or goods (freight), or a drone.

The device 1 more particularly relates to generating a yaw moment (according to the vertical axis of the aircraft) allowing for the lateral control of the taxiing aircraft. Within the context of the present invention, taxiing means any possible type of taxiing for an aircraft, such as running on a landing runway during landing and take-off phases, or running on traffic lanes or on maneuvering areas, in particular.

According to the invention, said device 1 comprises, as shown on FIG. 1:
  means 2 to be further described below, for generating command orders relating to the control of the orientation of the front wheel (not shown) of the aircraft. Within the context of the present invention, a front wheel is a mechanical assembly being provided with at least one wheel, being located at the front of the aircraft, preferably being part of a front landing gear of the aircraft, and being orientable so as to be able to laterally shift the aircraft when the latter is taxiing.
  a set 3 of information sources, more specifically comprising means for measuring, on a usual way, the usual ground speed of the aircraft;
  a calculation unit 4 being connected by means of links 5 and 6 respectively to said means 2 and to said set 3. Such a calculation unit 4 is formed so as to automatically determine, from said command orders and said current ground speed, first orders for at least one of the following command assemblies: a set of brakes E1 of the aircraft and a set of engines E2 of the aircraft. Each one of said command assemblies is able to generate a lateral movement of the aircraft about a vertical axis via an asymmetrical action (compared to the longitudinal symmetry plane of the aircraft). Said first orders are determined by the calculation unit 4 so as to generate on the aircraft, when they are applied to the corresponding command assembly, a lateral movement being substantially identical to the lateral movement that the application would have (usually) generated to an orientation system of said front wheel; and
  means 7 for automatically applying said first orders to said set of brakes E1 and/or to said set of engines E2.

As further described below in reference to FIGS. 4 and 5, said calculation unit 4 comprises means for, respectively:
  calculating an orientation angle of the front wheel, being representative of said command orders (generated by said means 2);
  calculating the current curve of a trajectory (of the aircraft) such as it would be if said front wheel was oriented according to such an orientation angle; and
  calculating said first orders from at least said current curve and said measured current ground speed.

The device 1 according to the present invention thus allows the aircraft to be controlled on the ground according to the lateral axis, in particular, in the event of a loss of control of the front wheel, as further described below. Consequently, said device 1 is adapted to provide a minimum directional control allowing the pilot to be able, at least, to quickly clear the landing runway when the orientation system of the front wheel of the aircraft no longer works properly, using the set of brakes E1 and/or the set of engines E2, and this, on an asymmetrical way.

Within the context of the present invention, said means 2 are, preferably, usual means for generating the command orders relating to the control of the orientation of the front wheel of the aircraft. More particularly, said means 2 could comprise:

- control units 9, for example a hand wheel, allowing a pilot of the aircraft to manually generate the command orders relating to the orientation of the front wheel of the aircraft; and/or
- an automatic pilot system 10 allowing to automatically generate, on a usual way, said command orders regarding the orientation of the front wheel.

Consequently, the device 1 could use the same control units as in the nominal case (the case where the orientation system of the front wheel works properly), i.e. the hand wheels and the rudder bars. It should be noticed that other control units, either existing or not, could be used for the manual control of such a function, for example units allowing for the lateral control with a view to the yaw speed. In any event, the pilot does not make use of the brake pedals and/or the thrust joysticks of the engines for the lateral control of the aircraft upon implementing the above mentioned basic embodiment of the device 1.

Furthermore, using such a device 1, the behaviour of the aircraft (in terms of dynamics and viewing point feeling of the pilot) is very similar to that of the nominal case. As it also uses the same control units as the nominal case, using such a function is consequently nearly transparent for the pilot, who can then keep his manual control habits for maneuvers on the ground normally requiring the front wheel. As a result, using such a device 1 does not require any adaptation time from the pilot, and the latter would thus not be surprised by the behaviour of the function that automatically takes over from lateral control of the aircraft, in the event of a sudden breakdown of the orientation system of the front wheel.

Furthermore, said device 1 could be controlled both manually by a human pilot (via the usual or future control units 9) as well as automatically by a usual automatic pilot system 10. Consequently, it is possible to keep the automatic control system 10 existing on the aircraft for all the existing ground automatic functions (automatic or partially automatic landing) as well as future functions (automatic or partially automatic take-off, automatic or partially automatic running).

Said means 7 being intended to apply said first command orders to a set of brakes E1 and/or to a set of engines E2 so that they generate an asymmetrical action on the aircraft in order to obtain a lateral movement of the latter, comprise:

- a command assembly E comprising said set of brakes E1 and/or said set of engines E2; and
- a set B of actuating means B1 and B2 of said sets E1 and E2, said set B receiving said first orders from said calculation unit 4 via a link 11 and applying them to said assembly E, as illustrated via a link 12 in mixed lines on FIG. 1.

For implementing the lateral control according to the present invention, the device 1 can thus act:

- either on one of the command sets E1 and E2 of the aircraft, i.e. on the brakes or the engines;
- or simultaneously on both command sets E1 and E2, that is both on the brakes and the engines of the aircraft.

In a particular embodiment, said device 1 could also comprise:

- usual command means 14 for the brakes of said set E1, being connected via a link 15 to the calculation unit 4; and/or
- usual command means 16 for the set of engines E2, being connected for example via a link 17 to said calculation unit 4.

In such a case, in a particular application, the calculation unit 4 (or the set B) receives, in addition to said first orders determined by said calculation unit 4, second orders generated by said command means 14 (and/or by said command means 16), and it determines, from such first and second orders, overall orders. In such a case, said actuating means B1 apply, the case being, the overall orders relating to said brakes to said set E1, and said actuating means B2 apply, the case being, the overall orders relating to said engines to said set E2.

Consequently, thanks to said control means 14, in particular, brake pedals and taking into account (second) orders generated by such command means 14, the pilot keeps the ability to brake. Similarly, using said command means 16, in particular, thrust joysticks and taking into account (second) orders generated by such command means 16, the pilot keeps the ability to increase the thrust of the aircraft and thus, the speed thereof.

Figure 2:
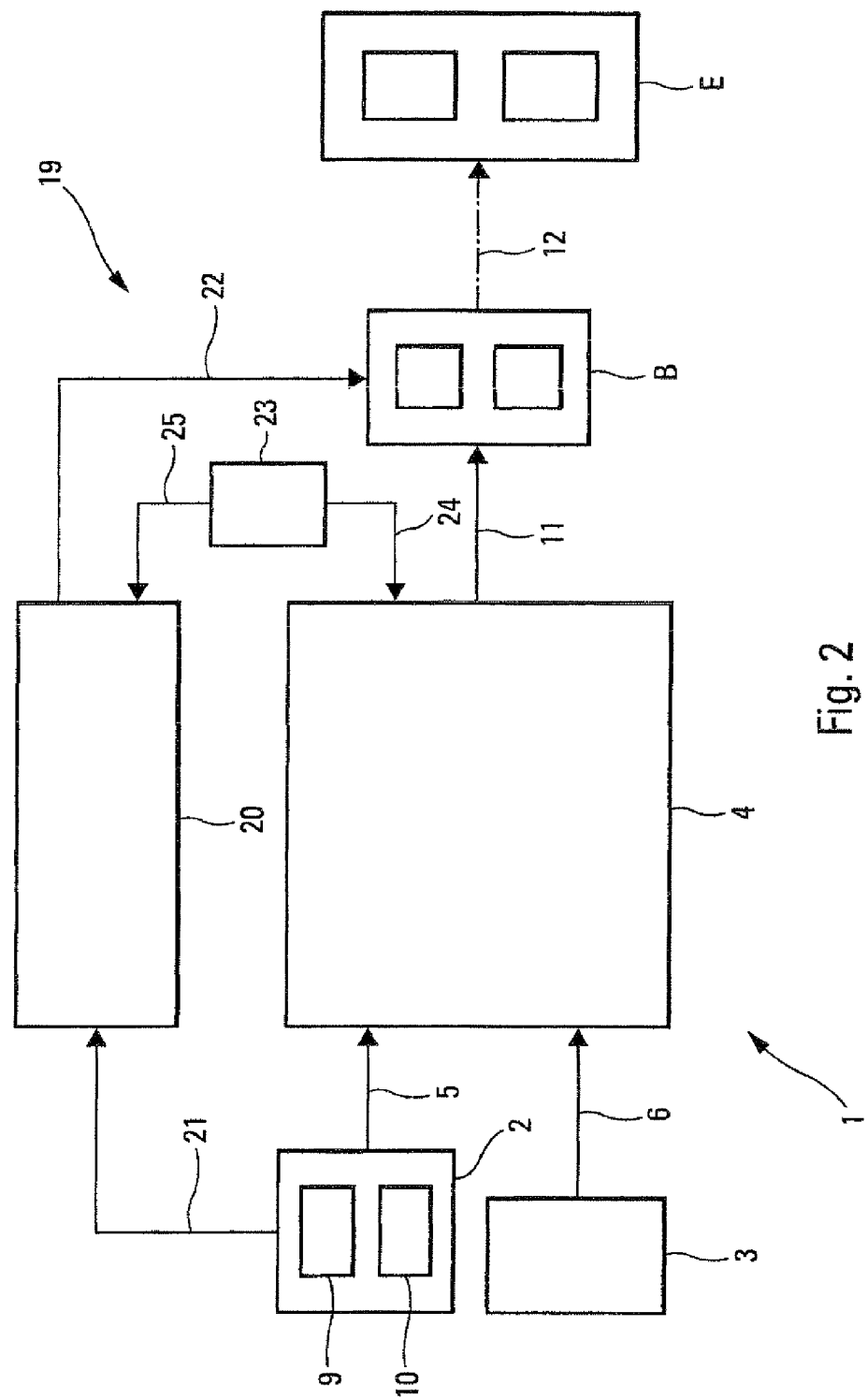
FIGS. 2 and 3 schematically show particular embodiments of a device according to this invention.

Furthermore, in a particular embodiment as shown on FIG. 2, said device 1 further comprises a usual orientation system 19 being intended for controlling the orientation of the front wheel of the aircraft. Such an orientation system (19) comprises:

- a calculation unit 20 receiving the command orders generated by said means 2 via a link 21 and transmitting actuating orders corresponding to said set B via a link 22; and
- a monitoring system 23 for automatically monitoring said orientation system 19 so as to be able to detect a breakdown of the latter.

In this particular embodiment, said device 1 is formed so that:

- as long as no breakdown is detected by said monitoring system 23, said device 1 automatically applies (on a usual way) the command orders generated by said means 2 to the front wheel via said orientation system 19, and implementing the calculation unit 4 (and the above-mentioned functions according to this invention) is inhibited; and
- as soon as a breakdown is detected by said monitoring system 23 transmitting, for example, the information thereabout via links 24 and 25 to said calculation units 4 and 20, the device 1 implements the lateral control according to this invention, by means of the calculation unit 4, and the orientation system 19 no longer applies the command orders generated by the means 2 to the front wheel.

Implementing such a particular embodiment does not require any adaptation time from the pilot. The pilot thus will not be surprised by the behaviour of the function, taking over from the lateral control of the aircraft, in the event of a sudden breakdown of the orientation system 19 of the front wheel. This makes the manual landing phase much more reliable, as the pilot can control the aircraft exactly as he would do in the nominal case, thus reducing his workload and his stress during a maneuver requiring a lot of attention.

Figure 3:
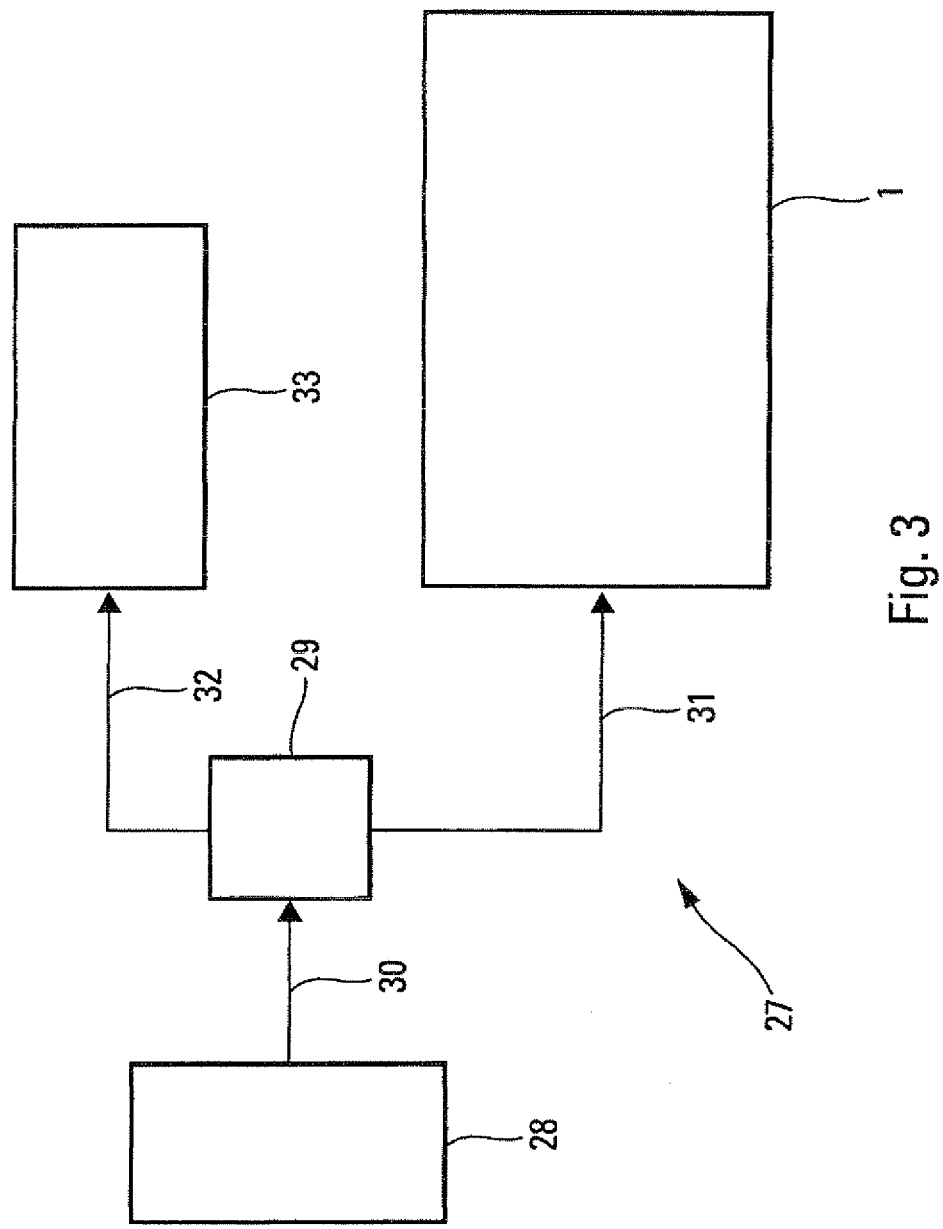

Furthermore, said device 1 could be part of a system 27, further comprising, as shown on FIG. 3:

- usual means 28 for generating an overall command order of the yaw moment of the taxiing aircraft; and means 29 being connected via a link 30 to said means 28 and automatically distributing such an overall order:
- into command orders relating to the control of the orientation of the front wheel, being transmitted via a link 31 to said device 1 (applying them as described above); and
- into auxiliary orders being transmitted via a link 32 to at least one assembly 33, for example the directional rudder of the aircraft or the orientation system of the front wheel.

Such an assembly 33 is formed so as to apply such auxiliary orders to the aircraft in order to act on the lateral movements of the aircraft.

In such a particular embodiment of FIG. 3, the device 1 could be considered as an additional actuator allowing the aircraft to be laterally controlled. The objective of the system 27 then comprises using braking and/or the asymmetrical thrust in addition (and/or in substitution) of the other actuators (assembly 33) influencing the lateral movements of the aircraft, and this, even in the absence of a breakdown of one or more of such actuators. Such a particular embodiment can be used for distributing the stresses needed for creating the yaw moment on different actuators, such as the orientation system of the front wheel, the directional rudder, the asymmetrical use of the brakes, and the asymmetrical use of the engines.

As previously indicated, for the lateral control of the aircraft according to this invention, the device 1 can either implement an asymmetrical use of the brakes, or implement an asymmetrical use of the engines. In the following description of the calculation unit 4, an asymmetrical use of the brakes will be only described.

Figure 4:
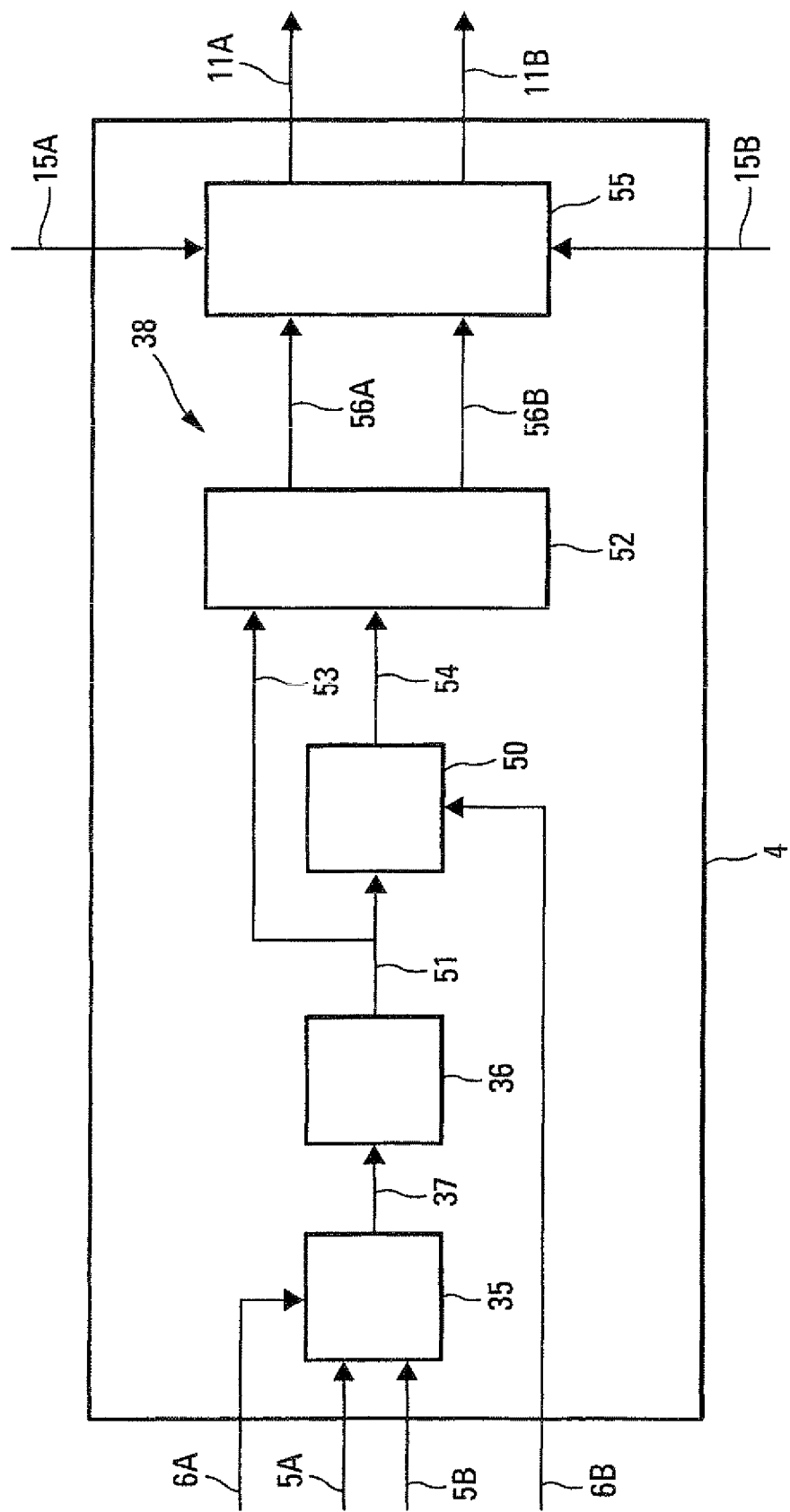
FIG. 4 schematically illustrates a calculation unit for a device according to this invention.

In this case, as shown on FIG. 4, said calculation unit 4 comprises:
- means 35 for calculating, from the command orders received from said manual control units 9 via a link 5A and/or command orders received from said automatic pilot system 10 via a link 5B, as well as from the measurements received from said assembly 3 via a link 6A, an orientation angle β of the front wheel, being representative of said command orders;
- means 36 being connected via a link 37 to said means 35 and being formed so as to calculate the usual curve of a trajectory of the aircraft, as it would be if said front wheel was oriented according to the orientation angle β received from said means 35; and
- means 38 for calculating said first orders, from the usual curve received from said means 36, as well as from the measurements to be described below, received via a link 6B.

Said links 5A and 5B on FIG. 4 are part of the link 5 on FIG. 1, and said links 6A and 6B are part of the link 6.

Said means 35 thus calculate an orientation angle β of the front wheel. Such an orientation angle β is generally that normally sent to the actuator orienting the front wheel, when the latter works properly.

Said means 35 could be achieved according to two different embodiments. In a first embodiment shown on FIG. 5, said means 35 comprise:
- a means 39 receiving, via a link 5A1, a command order from the hand wheel of the aircraft, manually actuated by the pilot, and transforming such an order by a first usual kinematics;
- a means 40 receiving, via a link 5A2, a command order generated by the rudder bar of the aircraft, manually actuated by the pilot, and transforming such a command order by a second usual kinematics;
- means 41, 42 and 43 each determining a weighting factor depending on the ground speed received via the link 6A;
- a means 44 for weighting the results of the processings implemented by the means 39, by the weighting factor from the means 41;
- a means 45 for weighting the results of the processings implemented by the means 40, by the weighting factor from the means 42;
- a means 46 for weighting the command order received from the automatic pilot system 10 via the link 5B, by the weighting factor generated by the means 43;
- a means 47 for summing information respectively from said means 44, 45 and 46; and
- a means 48 for limiting the sum from said means 47, said means 48 supplying at the outlet thereof the orientation angle β being transmitted by the link 37 to said means 36.

In this first embodiment, the orientation angle β of the front wheel is calculated by a direct law, this means that the angle β is a direct function (with no return) of the orders from the control units 9 (hand wheel, rudder bar, future units for example) and/or from the automatic pilot system 10. With this first embodiment, an order β is obtained, being a function, either linear or not, of the orders from said means 2.

Moreover, in a second embodiment (not shown), the angle β comes from a yaw slaving law, allowing to control the angle β so that the aircraft has a yaw speed being a function of the orders from the control units 9 (hand wheel, rudder bar, future units for example) and/or from the automatic pilot system 10. Such a ground yaw speed slaving is more precisely described in French patent no. 2,854,962.

In addition, said means 36 calculate, by means of the orientation angle β received from said means 35, an equivalent curve c representing the curve of the trajectory of the aircraft such as it would be if the orientation system 19 of the front wheel worked properly and if the front wheel was oriented by an angle β. Said means 36 calculate such a curve c through the following expression:

$$c = tg\beta/L$$

wherein:
- L is the longitudinal wheelbase of the aircraft, that is the distance between the axis of the front wheel and the median point of the main gears; and
- tg represents the tangent.

Furthermore, said means 38 comprise:
- means 50 being connected via a link 51 to said means 36 and being formed so as to calculate a controlled pressure P;
- means 52 being connected via links 53 and 54 respectively to said means 36 and 50 and being formed so as to determine the intermediary pressure orders PsG and PsD to be applied respectively to the left (G) or to the right (D); and
- means 55 being connected via links 56A and 56B to said means 52, as well as via links 15A and 15B being part of the link 15 to said control means 14, and being formed so as to determine the pressure orders (left and right) PcG and PcD that are to be respectively applied to the brakes acting on the left side and to the brakes acting on the right side of the aircraft.

Said means 50 calculate the controlled pressure P from the curve c received from said means 36 via the link 51 and from measured values received from said assembly 3 via a link 6B (being part of the link 6A of said link 6 on FIG. 1). Such measurements in particular relate to the ground speed Vground, the condition of the brakes Gf, the conditions of the tyres Gpn and the contamination of the runway Gpi. Said means 50 calculate, as a function of such parameters, a controlled pressure P (always positive or null) being such that, when the aircraft is slowed down on one side by brakes on which such a control pressure is applied, the trajectory of the aircraft shows a curve equal to said curve c.

To this end, in a first stage, a function f is searched for, equal to the curve c, being such that:

$$c=f(P,\text{Vground},Gf,Gpn,Gpi)$$

Several solutions could be contemplated for determining such a function f. They include, for example:

if the model of the aircraft and of the runway is known with enough accuracy, it is possible to determine an analytical relationship linking the curve c to the parameters P, Vground, Gf, Gpn, Gpi; and from trials (being real or simulated), it could be determined, for a number of values of each one of the parameters involved in the function f, the value of the curve c of the trajectory on the ground of the aircraft, for example in the shape of a table with several entries, or a series of tables with several entries.

Then, in a second stage, such a function f is inverted (whether it is analytical or expressed in the form of a table) so as to obtain a relationship between the controlled pressure P and in particular, Vground, Gf, Gpn, Gpi:

$$P=f^{-1}(c,\text{Vground},Gf,Gpn,Gpi) \text{ and } P \geq 0$$

Moreover, the function of said means 52 comprises distributing the controlled pressure P received from said means 50, to the left (PsG) or to the right (PsD), as a function of the curve c supplied by the means 36. Said means 52 implement such a distribution, based on the following relationships:

if c>0, PsG=P and PsD=0;

if c<0, PsG=0 and PsD=P; and if c=0, PsG=PsD=0

Moreover, the function of said means 55 comprises the steps consisting of:

limiting the pressure orders to the left and to the right to be transmitted; and adding, the case being, the pressure orders from the brake pedals 14, so that the pilot keeps the ability to brake the aircraft symmetrically and manually. To this end, said means 55 could receive, via a link 15A, the pressure order PfG from the left brake pedal and via a link 15B the pressure order PfD of the right brake pedal, said links 15A and 15B being part of the link 15 on FIG. 1.

The orders (PsG, PsD) from the means 52 are respectively summed with the pressure orders (PfG, PfD) from the brake pedals (both always positive or null) based on the following relationships:

$$\begin{cases} PiG = PsG + PfG \\ PiD = PsD + PfD \end{cases}$$

The orders PiG and PiD from such a summation are respectively limited by functions, the value of which depends on the maximum pressure tolerated by the brakes Pmax and the pressure orders PsG and PsD. The (final) pressure (controlled) orders on the left and on the right (both always positive or null) PcG ad PcD (being respectively transmitted by the links 11A and 11B), are obtained based on the following relationships:

$$\begin{cases} PcG = PiG & \text{if } PiG < P\text{max} - \lambda \cdot PsD \\ PcG = P\text{max} - \lambda \cdot PsD, & \text{if } PiG \geq P\text{max} - \lambda \cdot PsD \end{cases}$$

$$\begin{cases} PcD = PiD, & \text{if } PiD < P\text{max} - \lambda \cdot PsG \\ PcD = P\text{max} - \lambda \cdot PsG & \text{if } PiD \geq P\text{max} - \lambda \cdot PsG \end{cases}$$

wherein $\lambda$ is a weighting factor ranging from 0 and 1.

More precisely:

for $\lambda$ equal to 0, the longitudinal control (decrease of the speed through maximum braking) is preferred over the lateral control (the aircraft can no longer operate through asymmetrical braking if the brake pedals are completed depressed);

for $\lambda$ equal to 1, the lateral control (full authority of the yaw speed) is preferred over the longitudinal control (the pilot cannot more brake the aircraft as long as the hand wheel is fully swung for example); and an intermediary value of $\lambda$ (ranging from 0 to 1) allows to obtain a compromise entre the saturation of the actuators and the lateral control.

The invention claimed is:

1. A method for a lateral control of a taxiing aircraft, said aircraft being provided with an orientable front wheel, the method comprising:

a) generating, by order generating means (2), command orders relating to controlling the orientation of said front wheel;

b) measuring a current ground speed of the aircraft;

c) automatically determining from said command orders and said current ground speed, first orders for at least one of the following command assemblies of the aircraft:

a set of brakes (E1) and a set of engines (E2), each one of said command assemblies (E1, E2) being able to generate a lateral movement of the aircraft around a vertical axis by means of an asymmetrical action;

d) subsequently automatically applying the first orders to said command assemblies (E1, E2);

e) automatically monitoring an orientation system (19) for orienting said front wheel so as to be able to detect a breakdown of such an orientation system (19);

as long as no breakdown has been detected, automatically generating said command orders by means of said order generating means (2) to said orientation system (19) of the front wheel and not implementing said steps a) to d); and as soon as a breakdown is detected, automatically implementing said steps a) to d) so as to generate on the aircraft a lateral movement being substantially identical to the lateral movement that would have been generated by the application of said command orders to said front wheel, and not applying said command orders to said system of orientation (19) of the front wheel.

2. A method according to claim 1, wherein at step c):

c1) an orientation angle is calculated of the front wheel, being representative of said command orders;

c2) the current curve of a trajectory of the aircraft is calculated such as it would be if said front wheel was oriented according to said orientation angle; and c3) from at least said current curve and said measured current ground speed, said first orders are calculated.

3. A method according to claim 2, wherein at step c2), said current curve c is calculated by means of the following expression:

$$c = tg\beta/L$$

wherein:
- $\beta$ is the orientation angle of the front wheel, calculated at step c1);
- L is the longitudinal wheelbase of the aircraft; and
- tg represents the tangent.

4. A method according to claim 2, wherein at step c3):
- a controlled pressure is calculated, from said current curve and said measured current ground speed;
- from said current curve and said controlled pressure, intermediary pressure orders PsG and PsD are determined to be applied respectively to the left and to the right;
- from such intermediary pressure orders PsG and PsD, pressure orders PcG et PcD are calculated, representing first orders for a set of brakes (E1) and that are to be applied respectively to the brakes acting on the left side and to the brakes acting on the right side of the aircraft, said pressure orders PcG and PcD being calculated by means of the following relationships:

$$\begin{cases} PcG = PiG, & \text{if } PiG < P\max - \lambda \cdot PsD \\ PcG = P\max - \lambda \cdot PsD, & \text{if } PiG \geq P\max - \lambda \cdot PsD \end{cases}$$

$$\begin{cases} PcD = PiD, & \text{if } PiD < P\max - \lambda \cdot PsG \\ PcD = P\max - \lambda \cdot PsG & \text{if } PiD \geq P\max - \lambda \cdot PsG \end{cases}$$

wherein:
- $\lambda$ is a weighting factor;
- Pmax is a maximum pressure tolerated by the brakes;
- PiG is a pressure order obtained summing the intermediary pressure order PsG and a pressure order of the left brake pedal; and
- PiD is a pressure order obtained summing the intermediary pressure order PsD and a pressure order of the right brake pedal.

5. A method according to claim 1, further comprising:
- receiving an overall order for controlling the yaw moment of the taxiing aircraft;
- automatically distributing the overall order into command orders relating to the control of the orientation of the front wheel and into auxiliary orders;
- implementing said steps a) to d) for said command orders; and
- automatically applying said auxiliary orders to auxiliary means (33) adapted to act on the lateral movement of the aircraft.

6. A method according to claim 1, further comprising:
- receiving second orders for controlling said command assembly;
- determining overall orders from the second orders and said first orders; and
- at step d), applying said overall orders obtained from said first and second orders to said command assembly.

7. A method according to claim 1, wherein at step d), before applying said first orders to said command assembly, such first orders are limited to maximum values if they are higher than the latter.

8. A method according to claim 1, wherein at step c), first orders are determined comprising orders for said set of brakes (E1) and orders for said set of engines (E2), and in that at step d), such orders are applied respectively to said set of brakes (E1) and to said set of engines (E2).

9. A device for a lateral control of a taxiing aircraft, being provided with an orientable front wheel, said device (1) comprising:
- means (2) for generating command orders relating to the control of the orientation of said front wheel;
- means (3) for measuring a current ground speed of the aircraft; and
- a calculation unit (4) for automatically determining, from said command orders and said current ground speed, first orders for at least one of the following command assemblies: a set of brakes (E1) of the aircraft et a set of engines (E2) of the aircraft, each one of said command assemblies (E1, E2) being able to generate a lateral movement of the aircraft around a vertical axis by means of an asymmetrical action; and
- means (7) for automatically applying said first orders to said command assemblies (E1, E2), wherein it further comprises a monitoring system (23) for automatically monitoring an orientation system (19) adapted for orienting said front wheel so as to be able to detect a breakdown of such an orientation system (19), and in that said device (1) is formed such that:
- as long as no breakdown is detected by said monitoring system (23), said device (1) automatically applies the command orders generated by said order generating means (2) to the front wheel via said orientation system (19), and implementing the calculation unit (4) is inhibited; and
- as soon as a breakdown is detected by said monitoring system (23), the device (1) implements the lateral control by means of the calculation unit (4) so as to generate on the aircraft a lateral movement being substantially identical to the lateral movement that would have been generated by the application of said command orders to said front wheel, and the orientation system (19) no longer applies the command orders generated by the means (2) to the front wheel.

10. A device according to claim 9, said calculation unit (4) comprising:
- means (35) for calculating an angle of orientation of the front wheel, being representative of said command orders;
- means (36) for calculating the current curve of a trajectory of the aircraft such as it would be if said front wheel was oriented according to said orientation angle; and
- means (38) for calculating said first orders from at least said current curve and said measured current ground speed.

* * * * *